Nov. 27, 1928.
F. G. BABCOCK
LENS
Filed April 27, 1922
1,692,973
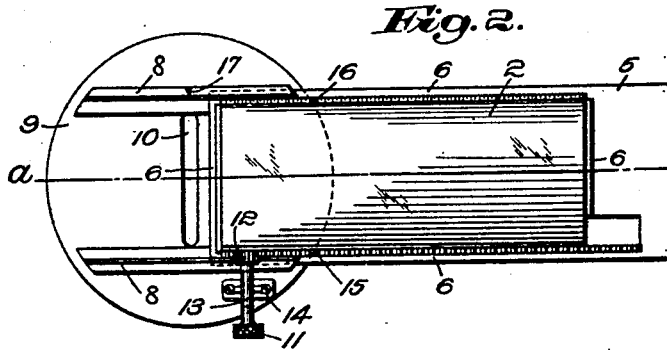
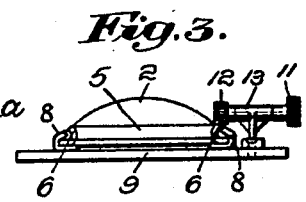
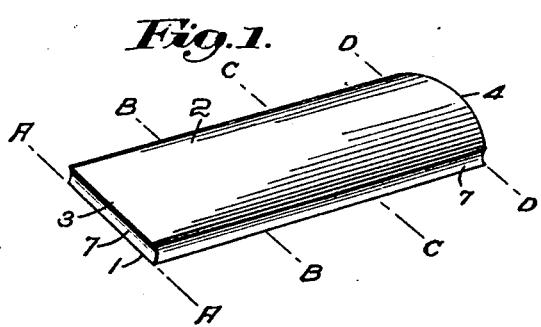
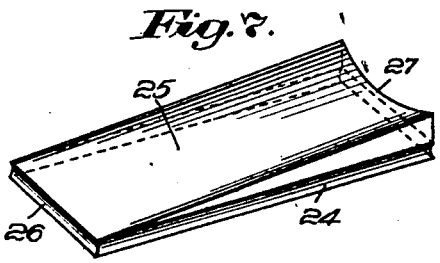
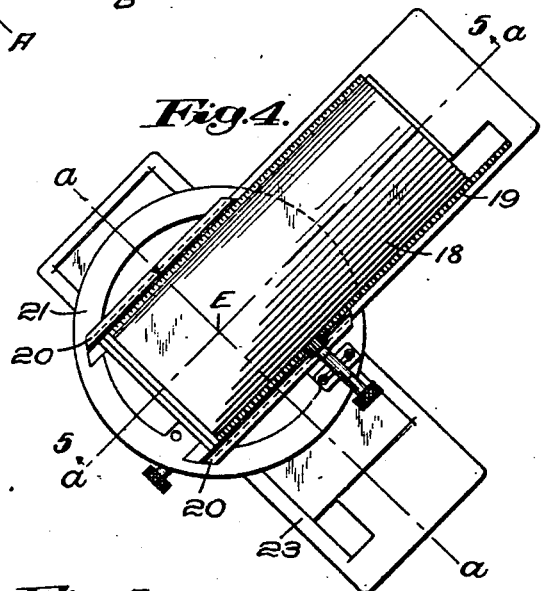
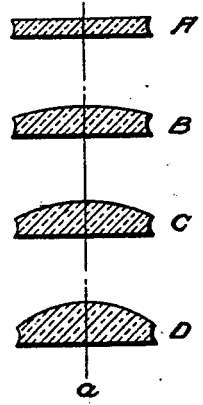
Inventor:
Frederick G. Babcock.
by Emery, Booth, Janney & Varney,
Attys Patented Nov. 27, 1928.

1,692,973

UNITED STATES PATENT OFFICE.

FREDERICK G. BABCOCK, OF MADISON, OHIO.

LENS.

Application filed April 27, 1922. Serial No. 556,961.

This invention relates to lenses and more particularly to lenses adapted for use in optometers, cameras, projectors and the like.

The invention will best be understood by reference to the following description and accompanying drawings of certain embodiments that have been selected merely for illustrative purposes.

In the drawings:

Fig. 1 is a perspective view of a lens embodying certain characteristics of the invention;

Fig. 2 is an elevation of the lens shown in Fig. 1 in a form adapted for use in an optometer;

Fig. 3 is an end elevation of the same;

Fig. 4 illustrates two lenses embodying the invention arranged to effect compound refraction either in connection with an optometer or with a camera, projector or like instruments;

Fig. 5 is a section on the line 5—5 of Fig. 4;

Fig. 6 shows a group of sections indicating the transverse curvatures of the lens at selected parallel planes in the length of the lens; and Fig. 7 is a perspective view of another form of lens embodying the invention.

Referring to the drawings, Fig. 1 represents a lens comprising a bar of refractive material such, for example, as crown glass having one face, herein the bottom 1, flat and preferably substantially rectilinear in form.

The other or upper face 2 of the lens is herein shown possessing varying degrees of curvature in transverse section from no curvature at all at the end 3 of the lens where no refraction of the rays of light passing therethrough will result, to a curvature at the end 4 capable of effecting the highest degree or power of refraction required of the lens; or expressing it another way, the curvature of the refracting face 2 of the lens will vary from a straight line at 3 to a curvature at 4 having a relatively short radius of predetermined length, the radii of successive sections between ends 3 and 4 gradually decreasing in length with their centers lying in a common vertical plane a—a see Fig. 6 substantially perpendicular to the face 1 and substantially bisecting the plane of said face in the direction of its length.

The lens shown in Fig. 1 is of plano-convex form in cross section, the convex face whereof gradually varies in curvature as shown most clearly in Fig. 6 by a series of cross sections A, B, C and D representing, respectively, the outlines of said lens in the several planes coinciding with the lines A—A, B—B, C—C and D—D of Fig. 1.

An important result produced by the peculiarly curved face 2 of the lens is the gradual progression in refractive power from plane to plane substantially throughout the length of the lens permitting a gradual transition from one degree of refraction to another through all the intervening powers with no abrupt change and with the focuses of successive sections falling in a common plane represented by the line a—a Fig. 2 embodying, in a single lens, all and more than has heretofore been embraced by a large number of individual lenses. Obviously such a lens is adapted to numerous uses.

In Figs. 2 and 3 of the drawings a lens embodying the invention has been illustrated in connection with a stenopaic disk of the type employed by occulists or opticians in trial frames for determining refractional aberrations or defects in the various meridians of the crystalline lens so that the necessary corrections may be supplied. To this end a frame 5 is provided herein surrounding the lens and having upstanding members 6, 6 at its ends and sides for engaging respectively the ends and sides of said lens herein within appropriately formed grooves 7. The frame 5 has an opening substantially equal in size to that of the lens in order to permit rays of light to pass through any part of the lens. Opposite sides of the frame 5 engage appropriate guides 8, 8 secured to one face of the stenopaic disk 9.

The disk 9 is preferably opaque and provided with a stenopaic slit 10 of usual proportions arranged herein at the center of said disk with its long dimension extending substantially at right angles to the plane a—a of the lens, and in the present example, is shaped to fit the sockets of an occulist's trial frame but as said frame forms no part of the invention it is not shown in the drawings.

It is desirable, when the lens is used in connection with a stenopaic disk, to move said lens so as to bring that portion of its curved face 2 possessing the required degree or power of refraction into register with the slit 10. Therefore, means are provided for effecting such a movement of the lens, said means herein consisting of a thumb nut 11 and pinion 12 secured to a spindle 13, the latter being journalled to rotate in a bracket 14 secured to the disk 9. The pinion 12 meshes with a rack 15 appropriately connected with the frame 5 whereupon the rotation of said thumb nut will transmit movement to said rack and frame along the guides 8, 8 to cause the lens to move across said disk.

If desired, means may be provided for measuring the movements of said frame with respect to said slit and to this end graduations 16 are formed at the side of the frame 5 preferably upon a portion thereof to register with an index 17 herein placed on a stationary part of the device.

Another adaptation of the invention is shown in Figs. 4 and 5 involving the use of a lens similar to that shown in Fig. 1 combined with another of substantially the same form and arranged to produce compound refraction.

This embodiment of the invention comprises a lens 18 mounted within a frame 10 adapted to slide in appropriate guides 20, 20 attached to a ring 21. A second lens 22 carried by a frame 23 is arranged preferably, though not essentially, with its longitudinal axis disposed substantially at right angles to the longitudinal axis of the lens 18. The flat faces of the lenses 18 and 22 are herein placed face to face and the frames 19 and 23 which may be, and preferably are, similar to the frame 5 of Fig. 2 are provided with operating means also like those of the frame 5, the outer faces of the lenses 18 and 22 embodying variations in curvature substantially as hereinbefore described so that, by placing the two lenses with their axes in different planes, or substantially at right angles to each other as shown, a section of one lens possessing a given refractive power may be brought into register with a common focal axis of the instrument as indicated at E, Fig. 4 to cooperate with a selected section of another lens.

Obviously the lenses of the combination are not limited to the arrangement shown wherein the planes a—a thereof intersect each other at right angles but said lenses may be placed at substantially any angle that may be desired, the present arrangement being shown merely as an example.

Although, in the preceding figures, I have referred to a bar or lens having a convex surface it is obvious that, within the scope and purpose of the invention, a lens with a concaved surface may be inserted in place of the convex lens and in Fig. 7 I have shown a lens of the concave type provided with a flat rectilinear base 24 and a curved face 25 varying in curvature from a straight line 26 at one end of the bar to an arc as indicated at 27 of relatively short radius, the curvature of said arc 27 as well as of the arc represented at the end 4 of Fig. 1 being such as to produce the maximum refraction required of the lens.

With the arrangement of lenses shown in connection with the stenopaic disk as in Figs. 2 and 3 or with another unit like itself as in Figs. 4 and 5 the aberrations or defects in the refractive power of a given meridian of the human eye may be carefully determined by revolving the lens about the focal axis of the crystalline lens until the long dimension of the stenopaic slit or the axis of one or the other lens, where two are used, properly registers with a given meridian and then by slowly and gradually moving the lenses transversely of said slit or of the focal axis of the crystalline lens until the particular section of the lens that has the refractive power necessary to neutralize the defect in the sight is brought into register with said slit or with the focal axis of the eye.

From the foregoing it will be obvious that any error in vision whether due to astigmatism, far sightedness or near sightedness may be determined with great precision without abrupt transition from one power to another and hence with practically no shock to the muscles and nerves of the eye. Furthermore a substantially unlimited range of variation in refraction from no power to the highest power required in cylindrical, spherical, or compound powers may be embodied in a single instrument, thus obviating the necessity of any change of lens throughout the entire examination.

It will also be obvious that by proper combination and adjustment of lenses such as above described, a compound lens of any refractive power may be provided for use in photography, light projection or similar arts.

Having thus described certain illustrative embodiments of my invention, I desire it to be understood that although specific terms are employed they are used in a generic and descriptive sense and not for purposes of limitation, the scope of the invention being set forth in the following claims:

Claims:

1. A lens having a transversely curved face constituting a refracting surface uniformly increasing in refractive power from zero to a selected maximum power of refraction in a longitudinal direction only, and means to direct a plane of light through a selected transverse plane of said lens.

2. In combination, an opaque member provided with a transparent slit and a lens having a refracting surface possessing progressively increasing degrees of refraction in one direction only arranged to move transversely of said opaque member to effect a registering of selected sections of varying curvature of said lens with said slit.

3. In combination, an opaque member provided with a transparent slit, a lens having a refracting surface possessing progressively increasing degrees of refraction in one direction arranged to move transversely of said opaque member to effect a registering of sections of said lens of selected curvature with said slit, and means to move said lens transversely of said opaque member.

4. In combination, a lens having at least one refracting surface curved transversely to its longitudinal median line on arcs varying from a given radius at one end to one approaching infinite radius at the other end, a supporting member for said lens, a stenopaic slit and means to move said lens to register a selected transverse section thereof with said stenopaic slit.

5. In combination, a stenopaic disk and a bar of refractive material having one of its faces varying in transverse curvature from an arc of determined radius to a straight line, and means for effecting a longitudinal movement of said bar transversely of said disk.

6. A lens comprising a bar of refractive material having a curved refracting face extending from a straight edge at one end of said bar to an edge of predetermined curvature at the other end of said bar, said curved face possessing uniformly increasing degrees of refraction from said straight edge to said curved edge and means for directing restricted rays of light through selected sections of said bar.

7. A refracting member having longitudinal straight lines and transverse curved lines, successive transverse lines of said member being of uniformly increased curvature from a straight line at one end to a maximum curvature at the other end of said member, and constituting a lens of varying powers of refraction, and means for directing a plane of light through a selected transverse plane of said lens.

8. A refracting member having longitudinal straight lines and transverse curved lines, successive transverse lines of said member being of uniformly increased curvature from a straight line at one end to a maximum curvature at the other end of said member arranged for subjectively and objectively measuring the lenses of the eye, and means to direct rays of light through selected transverse sections of said refracting member.

In testimony whereof, I have signed my name to this specification.

FREDERICK G. BABCOCK.